March 25, 1958 — A. F. SHAFTER — 2,827,847
STEAK AND FRANKFURTER BROILER
Filed April 14, 1955
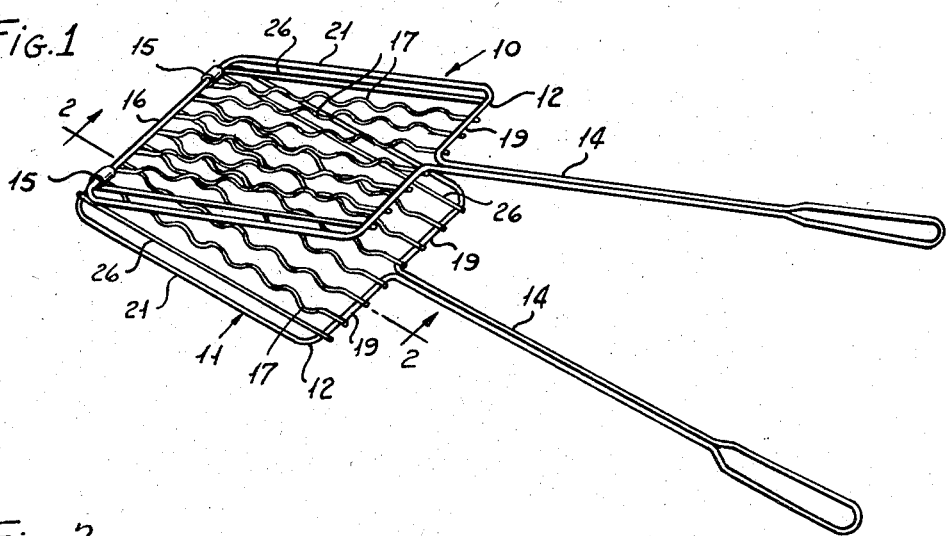
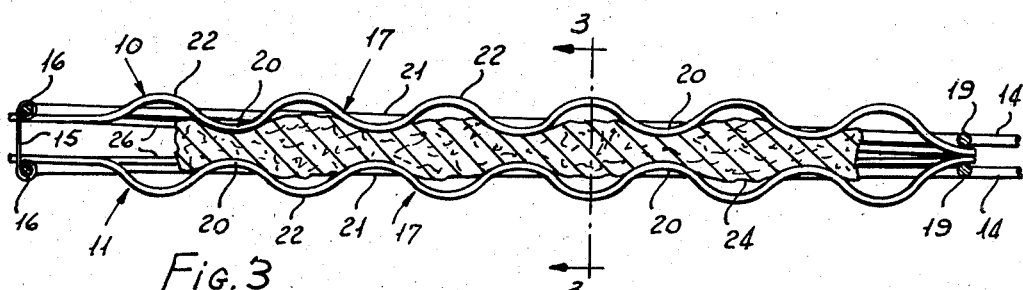
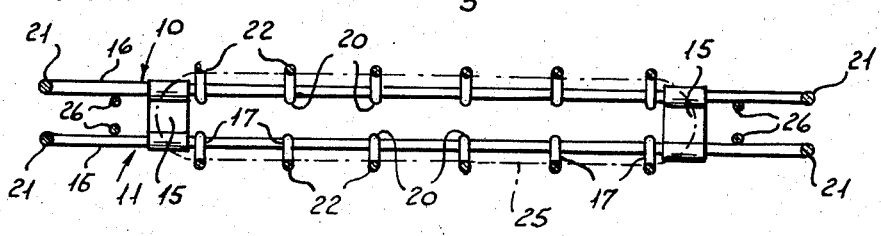
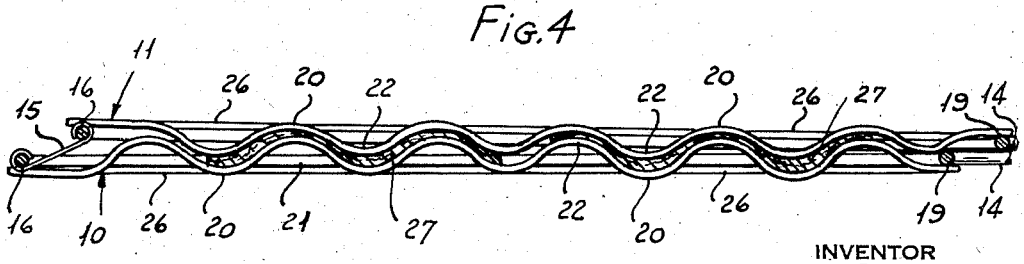
INVENTOR
ADOLPH F. SHAFTER
BY
Kenyon & Kenyon
ATTORNEYS

# United States Patent Office 2,827,847
Patented Mar. 25, 1958

2,827,847

STEAK AND FRANKFURTER BROILER

Adolph F. Shafter, Decatur, Ill., assignor to U. S. Manufacturing Corporation, Decatur, Ill., a corporation of Illinois Application April 14, 1955, Serial No. 501,356

3 Claims. (Cl. 99—394)

This invention relates to a broiler for holding either broad pieces of meat such as steaks or smaller individual pieces such as frankfurters.

Previously available hand held broilers, wherein food such as meat is held between top and bottom grid members for cooking over an open fire, are generally made specifically for either broad continuous pieces of meat, such as steaks, or individual rounded pieces such as frankfurters. Broilers which have satisfactorily held steaks are usable with difficulty with frankfurters. There is the danger of having the frankfurter drop out, or of cooking it inadequately. Broilers which have been specifically designed for frankfurters have been far from ideal for holding steaks, usually because of insufficient area and also poor gripping of the steak.

The broiler of the present invention is of such construction that it holds broad pieces of meat, and alternatively a plurality of frankfurters, securely and allows the cooking of steaks and frankfurters equally well. In addition, the broiler is of such construction that it may be manipulated to hold either thick steaks or thin pieces such as cube steaks, Canadian bacon, and the like.

It is among the objects of my invention to provide an improved broiler, having top and bottom grids, which allows the secure holding and satisfactory cooking of either broad pieces of meat such as steaks or of a plurality of rounded individual pieces such as frankfurters, to provide a broiler of the type indicated wherein the grids have a plurality of opposed narrow gripping surfaces distributed over their surfaces for holding a steak, to provide a broiler of the type indicated in which the grids may be easily manipulated to change the spacing between opposed gripping surfaces of the two grids when they are in their closed, food-holding position, and to provide a broiler which may be rapidly and economically produced in quantity.

The above and further objects of the invention will be more readily apparent in the following description of a preferred embodiment of the broiler of my invention.

In the drawing accompanying the specification and forming a part thereof:

Fig. 1 is a view in perspective of the broiler in partially open position, the broiler being shown with the grids folded in a first manner so that they will provide a substantial distance between opposing steak gripping surfaces when the grids are brought into closed position.

Fig. 2 is a fragmentary longitudinal vertical section through the broiler folded as in Fig. 1 but with the grids closed and gripping a thick steak between them, the major portion of the handles being broken away, the plane of the section being indicated by the line 2—2 of Fig. 1.

Fig. 3 is a transverse vertical section through the closed broiler folded as in Figs. 1 and 2 but holding a frankfurter in one of the pockets of the broiler, the frankfurter being shown in phantom lines, the section through the broiler being taken on the line 3—3 of Fig. 2.

Fig. 4 is a fragmentary longitudinal vertical section through the broiler folded in a second manner so that the opposed gripping surfaces of the grids approach each other closely, the grids being shown gripping pieces of thin meat such as Canadian bacon.

The illustrated broiler has two similar grids 10 and 11 each having a flat rectangular open frame 12 made of one length of fairly heavy wire. The wire forming the frame is brought in close to the center of the front of the frame in front frame portions 19, and is then extended forwardly into parallel elongated runs lying close together near the frame and separated at the bight to form the handles 14. Preferably the abutting ends of each length of wire forming a grid frame and handle are butt welded or brazed together in one of the runs of wire in the handle.

The two grids 10, 11 are hinged together at their rear ends by the two spaced hinge links 15 having ends curled about the rear wire portion 16 of each grid frame. The hinge links maintain the two grids with their corresponding side frame portions 21 substantially in the same vertical planes while allowing the free pivoting of the grids between open and closed positions. In addition, the hinge links permit the reversal of the relative positions of the grids, in a manner to be described, from the first closed position shown in Figs. 1, 2, and 3 to the second closed position illustrated in Fig. 4.

Each of grids 10, 11 is provided in its central portion with a plurality of similar, similarly positioned, parallel sinuous stiff wires 17 uniformly spaced laterally of the frame and extending parallel to side frame portions 21 from the rear frame portion 16 to the front frame portions 19. The wires 17 of each grid lie in planes perpendicular to the frame, and are attached to such frame portions, as by being brazed thereto. In the first position of the grids 10, 11, shown in Figs. 1, 2, and 3, the ends of the wires 17 lie beneath the front and rear frame portions of the grid 10 and above such frame portions of the grid 11. Each wire 17 is bent into a plurality of sine-like curves the outermost portions or peaks 22 (Fig. 2) and the innermost portions or valleys 20 (Fig. 2) of which lie in spaced planes parallel to the plane of the frame of its respective grid.

When the grids of the broiler are in the first closed position, the valleys 20 of the wires 17 of the opposing grids lie opposite and spaced from each other when the broiler is closed and hinge links 15 lie generally perpendicular to the planes of the grids as shown in Fig. 2. In that figure the broiler is shown as being closed upon a relatively thick steak 24 which is held by being gripped between the opposed valleys 20 of wires 17. As is evident, the steak is engaged by the wires 17, when the grids are closed upon it by gripping handles 14 together, at zones which are uniformly spaced from front to rear of the broiler and are uniformly and rather widely spaced laterally of the broiler. Thus the main extent of the steak is open to the action of an open fire. Usually the peaks 22 of the wires 17 will extend markedly outwardly of the outer surface of the steak, as shown. The exposed outer portions of the wires are free to absorb heat from the fire; the heat thus absorbed by the wires is transmitted along them and to the gripped portions of the steak, thereby tending to cook the gripped portions of the steak to about the same extent as the portions of the steak directly exposed to the fire.

The broiler of the invention, as indicated, is also useful in the broiling of individual pieces of food such as frankfurters, which it holds securely in the aligned transversely extending pockets formed by the wires 17 of the opposing grids. With the construction shown, and with the grids 10, 11 in their first position relative to each other, the broiler will hold six frankfurters. Fig. 3 makes clear the manner of holding of the frankfurters by the broiler.

As there shown, a frankfurter 25 is positioned in a pocket formed by the aligned peak portions 22 of the wires 17 of the opposing closed grids 10, 11. Ordinarily the diameter of the frankfurter is such that it is loosely received in such pocket and thus may move somewhat longitudinally in the pocket when the broiler is turned over about the axis of the closed-together handles 14. To prevent endwise escape of the frankfurters from their pockets, an end stop means is provided at each end of the pockets. Each stop means consists of two straight spaced parallel wires 26, each such wire extending from the front to the back of its respective grid parallel to the side of the grid and outwardly of the outermost sinuous wire 17. Each wire 26 (Figs. 1, 2, and 3) lies inwardly of the frame side portion 21, and is attached to the frame by being brazed to the front and rear frame portions. The opposing wires 26 forming each stop means are spaced from each other a distance less than the diameter of the frankfurter, and thus prevent the longitudinal travel of the frankfurter past them. The end stops lie a distance further apart than the length of a conventional frankfurter. The normal limited freedom of travel of the frankfurter in the pocket permitted by the end stops aids in cooking the frankfurter uniformly, particularly if the broiler is turned over occasionally.

In Fig. 4 the broiler is illustrated in its second closed position wherein the "peak" zones 22 of grid wires 17, which were disposed outwardly in the first position of the grids, are now located inwardly of the grids in position to grip thin pieces of meat. The broiler grids are changed from the first to the second position by simply rotating the grids 10, 11 about hinge connections 15 through an angle of 180° from the position of Fig. 2 to that of Fig. 4, so that grid 10 now becomes the bottom grid in Fig. 4, and grid 11 lies at the top. The parts of the grids are so proportioned that when the broiler is in its second closed position and the hinge links 15 lie generally perpendicular to the planes of the grids the zones 22 of the wires 17 on opposite grids either contact each other or confront each other closely.

In the operation of turning the upper grid 10 of Fig. 1 over the lower grid 11 the hinge links 15 usually tend to assume the tilted position shown in Fig. 4 when the grids are in their second closed position. Such inclination of links 15 plus a slight canting sidewardly of one grid relative to the other allow the zones 22 of wires 17 of the opposing grids to slide past each other somewhat and to lie in close side by side and somewhat intermeshed relationship. In this position zones 22 of the wires of the opposite grids securely grip and hold thin pieces of meat 27 (Fig. 4) such as Canadian bacon, cube steaks, and the like between them.

Whereas I have shown and described one embodiment of the steak and frankfurter broiler of my invention, it will be understood that such embodiment is illustrative only, and that the device may be changed as to various details within the scope of the invention.

What I claim is:

1. A broiler comprising two similar generally flat grid members, each having an open frame, the grids being hinged together along one side to shift longitudinally relative to one another and to pivot with respect to each other through about 180° between two food-holding positions in which they lie generally parallel to each other, the broiler having means whereby the grids may be held together in either closed position, each grid provided in its central portion with a plurality of spaced parallel stiff sinuous wires extending across the frame and lying in planes transverse to the plane of the frame, the peaks of the wires on one grid confronting and being markedly spaced from the peaks of the wires on the other grid when the grids are in one closed position, the wires of the two grids lying close to each other in generally side by side relationship when the grids are in the other closed and longitudinally shifted position.

2. A broiler comprising two similar generally flat grid members each having an open frame, a hinge connection between grids at one end of each grid and comprising links spacing the ends apart and maintaining the sides of the respective frames substantially parallel, the hinge connection allowing pivoting of the grids through 180° between two closed positions in which the grids lie substantially parallel and confront each other and further causing relative longitudinal shifting of said frames in one of said positions, means whereby the grids may be held together in either closed position, each grid having a plurality of spaced similar, similarly positioned parallel stiff sinuous wires extending across the central portion of the frame from the hinged end to the opposite end of the grid frame and lying in planes transverse to the plane of the frame, the peaks of the wires on one grid confronting the peaks of the wires on the other grid when the grids are in one closed position and the links are generally perpendicular to the planes of the grid frames, the wires of the two grids lying close to each other in generally side by side relationship when the grids are in the other closed and longitudinally shifted position and the links are disposed obliquely to the planes of the grids.

3. A broiler comprising two similar generally flat grid members each having an open frame, a hinge connection between grids at one end of each grid and comprising links spacing the ends apart and maintaining the sides of the respective frames substantially parallel, the hinge connection allowing pivoting of the grids through 180° between two closed positions in which the grids lie parallel and confront each other and further causing relative longitudinal shifting of said frames in one of said positions, means whereby the grids may be held together in either closed position, each grid having a plurality of spaced similar, similarly positioned parallel stiff sinuous wires extending across the central portion of the frame from the hinged end to the opposite end of the grid frame and lying in planes transverse to the plane of the frame, the peaks and valleys of the wires on one grid confronting the peaks and valleys, respectively, of the wires on the other grid when the grids are in a first closed position and the links are generally perpendicular to the planes of the grid frames, in said first position the wires of opposite grids forming a plurality of parallel frankfurter-holding pockets, wires of the two grids lying close to each other and at least partially overlapping when the grids are in the other closed and longitudinally shifted position and the links are disposed obliquely to the planes of the grids, and an elongated member extending along each of the two opposite sides of each grid parallel to the wires thereof in a position partially overlying the frankfurter-holding pockets formed by the grid wires when the grids are in their first position.

References Cited in the file of this patent

UNITED STATES PATENTS

| 237,286 | Johnson et al. | Feb. 1, 1881 |
| 306,164 | Langley | Oct. 7, 1884 |
| 890,219 | Cook | June 9, 1908 |
| 1,201,704 | Davite | Oct. 17, 1916 |
| 1,945,165 | Smith | Jan. 30, 1934 |
| 1,999,002 | Bennett | Apr. 23, 1935 |
| 2,594,500 | Runnoe | Apr. 29, 1952 |
| 2,652,766 | Cralle | Sept. 22, 1953 |
| 2,752,846 | Lucas | July 3, 1956 |